United States Patent
Isberg et al.

(10) Patent No.: US 9,286,090 B2
(45) Date of Patent: Mar. 15, 2016

(54) METHOD AND SYSTEM FOR COMPILER IDENTIFICATION OF CODE FOR PARALLEL EXECUTION

(71) Applicant: Sony Corporation, Tokyo (JP)

(72) Inventors: Anders Isberg, Åkarp (SE); Jonas Gustavsson, Malmö (SE); Jim Rasmusson, Vellinge (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/382,886

(22) PCT Filed: Jan. 20, 2014

(86) PCT No.: PCT/IB2014/000050
§ 371 (c)(1),
(2) Date: Sep. 4, 2014

(87) PCT Pub. No.: WO2015/107378
PCT Pub. Date: Jul. 23, 2015

(65) Prior Publication Data
US 2015/0212837 A1    Jul. 30, 2015

(51) Int. Cl.
*G06F 9/45* (2006.01)
*G06F 9/455* (2006.01)

(52) U.S. Cl.
CPC .......... *G06F 9/4552* (2013.01); *G06F 8/4452* (2013.01); *G06F 8/456* (2013.01)

(58) Field of Classification Search
CPC .............................. G06F 8/456; G06F 9/4552
USPC ................................................ 717/140–161
See application file for complete search history.

(56) References Cited

U.S. PATENT DOCUMENTS

| | | | |
|---|---|---|---|
| 6,625,725 B1 * | 9/2003 | Wu et al. ..................... | 712/245 |
| 7,243,345 B2 * | 7/2007 | Ohsawa et al. .............. | 717/149 |
| 7,458,065 B2 * | 11/2008 | Sanchez et al. ............. | 717/131 |
| 7,627,864 B2 * | 12/2009 | Du et al. ..................... | 717/159 |
| 8,359,587 B2 * | 1/2013 | Song et al. .................. | 717/159 |
| 8,677,337 B2 * | 3/2014 | Song et al. .................. | 717/159 |
| 2003/0014473 A1 * | 1/2003 | Ohsawa et al. .............. | 709/107 |
| 2004/0154010 A1 * | 8/2004 | Marcuello et al. ........... | 717/158 |
| 2004/0154011 A1 * | 8/2004 | Wang et al. ................. | 717/158 |
| 2005/0144602 A1 * | 6/2005 | Ngai et al. .................. | 717/151 |
| 2006/0064692 A1 * | 3/2006 | Sanchez et al. ............. | 718/100 |

(Continued)

OTHER PUBLICATIONS

Kazi et al., "JavaSpMT: A Speculative Thread Pipelining Parallelization Model for Java Programs," 2000, IEEE.*

(Continued)

*Primary Examiner* — Qing Chen
(74) *Attorney, Agent, or Firm* — Myers Bigel Sibley, P.A.

(57) ABSTRACT

A method in a system for handling compiled code is provided. The system comprises a Just-In-Time, JIT, compiler for compiling code, and at least one array processor unit comprising a plurality of processors for executing program code. The method comprises compiling input program code, whereby compiled program code is generated for the input program code. While compiling at least two parts of the compiled program code to be executed in parallel are identified. The identified at least two parts of compiled code are executed in parallel speculatively on at least two respective of the plurality of processors. Control if the at least two parts of in parallel executed code are in conflict with each other is performed, and if the parts are in conflict, the parts are executed again.

18 Claims, 2 Drawing Sheets

(56) References Cited

U.S. PATENT DOCUMENTS

| | | | | |
|---|---|---|---|---|
| 2007/0011684 | A1* | 1/2007 | Du et al. | 718/105 |
| 2009/0276758 | A1* | 11/2009 | Song et al. | 717/124 |
| 2009/0276766 | A1* | 11/2009 | Song et al. | 717/159 |
| 2010/0269102 | A1 | 10/2010 | Latorre et al. | |
| 2011/0067015 | A1* | 3/2011 | Takagi et al. | 717/149 |
| 2013/0166886 | A1* | 6/2013 | Sasanka et al. | 712/216 |

OTHER PUBLICATIONS

Pickett et al., "Speculative Multithreading in a Java Virtual Machine," Mar. 25, 2005, McGill University, p. 1-36.*
Pickett et al., "SableSpMT: A Software Framework for Analysing Speculative Multithreading in Java," Sep. 2005, ACM, p. 59-66.*
Pickett et al., "Software Thread Level Speculation for the Java Language and Virtual Machine Environment," 2007, Springer-Verlag, p. 304-318.*
Pickett, Christopher J. F., "Software Speculative Multithreading for Java," Oct. 2007, ACM, p. 929-930.*
Llanos et al., "Just-In-Time Scheduling for Loop-based Speculative Parallelization," 2008, IEEE, p. 334-342.*
Martinsen et al., "The Effect of Thread-Level Speculation on a Set of Well-known Web Applications," 2011, Electronic Research Archive of Blekinge Institute of Technology.*
Martinsen et al., "Combining Thread-Level Speculation and Just-In-Time Compilation in Google's V8 JavaScript Engine," 2013, Lund University Publications, p. 1-20.*
Martinsen et al., "Using Speculation to Enhance JavaScript Performance in Web Applications," Mar./Apr. 2013, IEEE, p. 10-19.*
International Search Report for International Application No. PCT/IB2014/000050 mailed Aug. 6, 2014, 4 pages.
Written Opinion of the International Searching Authority for International Application No. PCT/IB2014/000050 mailed Aug. 6, 2014, 7 pages.
Jan Martinsen et al.: "Heuristics for Thread-Level Speculation in Web Applications", IEEE Computer Architecture Letters, Journal of $L^A T_E X$ Class Files, vol. 6, No. 1 Jan. 2007, XP055127004, ISSN: 1556-6056, DOI: 10.1109/L-CA.2013.26, 4 pages.
Martinsen et al.: "Heuristics for Thread-Level Speculation in Web Applications", IEEE Computer Architecture Letters, Preprint; Published by IEEE Computer Society © 2013; Nov. 20, 2013; 4 pages.

* cited by examiner

METHOD AND SYSTEM FOR COMPILER IDENTIFICATION OF CODE FOR PARALLEL EXECUTION

CROSS REFERENCE TO RELATED APPLICATION

This application is a 35 U.S.C. §371 national stage application of PCT International Application No. PCT/IB2014/000050, filed in the English language on 20 Jan. 2014, the disclosure and content of which is incorporated by reference herein in its entirety.

TECHNICAL FIELD

Embodiments herein relate to methods in a system for handling compiled code, and especially for in parallel executing parts of compiled code. Other embodiments herein relate to a system comprising a Just-In-Time, JIT, compiler for compiling code, and at least one array processor unit comprising a plurality of processors for executing program code.

BACKGROUND

Thread level speculation has been found to be a method that may be used to parallelize execution of applications without updating the application logic to utilize many cores. In particular, JavaScript based applications benefit significantly on application processors, Central Processing Units (CPU), with multiple cores.

When executing a JavaScript program, the code is typically compiled with a Just In Time compiler where compilation speed is important. The generated code is then made available as fast as possible for execution and more or less no optimizations are applied. By gathering statistics about how frequently different code parts are executed it is possible to spot important code segments "hot code areas" consuming a lot of processor time. The compiler focuses on those code areas and starts to optimize the code. Typically, this is done as a parallel activity, thereby enhancing the performance during execution time.

Thread level speculation is a different method to enhance performance. The concept is that once a new function is found, the function is started in a new thread in a speculative manner. This function may run in parallel with other functions that has their own thread. Once the execution of the function is ready, it is checked if there are any failures or conflicts, due to the speculation. If there is a failure or conflict, a rollback is executed and the function is re-executed in sequential manner. If the speculation fails, there is typically some mechanism that prohibits that the function is speculated on again or at least decreases the likelihood that the function is speculated on, in favor of other functions that is more likely to be successfully. In particular for web applications this methodology may be very useful.

SUMMARY

An object of embodiments herein is to provide an improved way of speculatively executing code in parallel.

According to a first aspect the object is achieved by a method in a system for handling compiled code. The system comprises a Just-In-Time (JIT) compiler for compiling code, and at least one array processor unit comprising a plurality of processors for executing program code. The JIT compiler compiles input program code, whereby compiled program code is generated for the input program code. While compiling, the JIT compiler identifies at least two parts of the compiled program code to be executed in parallel. The identified at least two parts of compiled code are speculatively executed in parallel on at least two respective of the plurality of processors. The system controls if the at least two parts of in parallel executed code are in conflict with each other, and if the parts are in conflict, execution is repeated.

The above mentioned object is achieved, in another aspect, by a system for handling compiled code. The system comprises a Just-In-Time (JIT) compiler for compiling code, and at least one array processor unit comprising a plurality of processors for executing program code. The JIT compiler is adapted to compile input program code, whereby compiled program code is generated for the input program code. The JIT compiler is adapted to, while compiling, identify at least two parts of the compiled program code to be executed in parallel. The at least one array processor unit is adapted to, in parallel, execute the identified at least two parts of compiled code speculatively on at least two respective of the plurality of processors. The system is adapted to control if the at least two parts of in parallel executed code are in conflict with each other.

BRIEF DESCRIPTION OF THE DRAWINGS

Examples of embodiments herein are described in more detail with reference to attached drawings in which.

DETAILED DESCRIPTION

Embodiments herein will be exemplified in the following non-limiting description.

Figure 1:
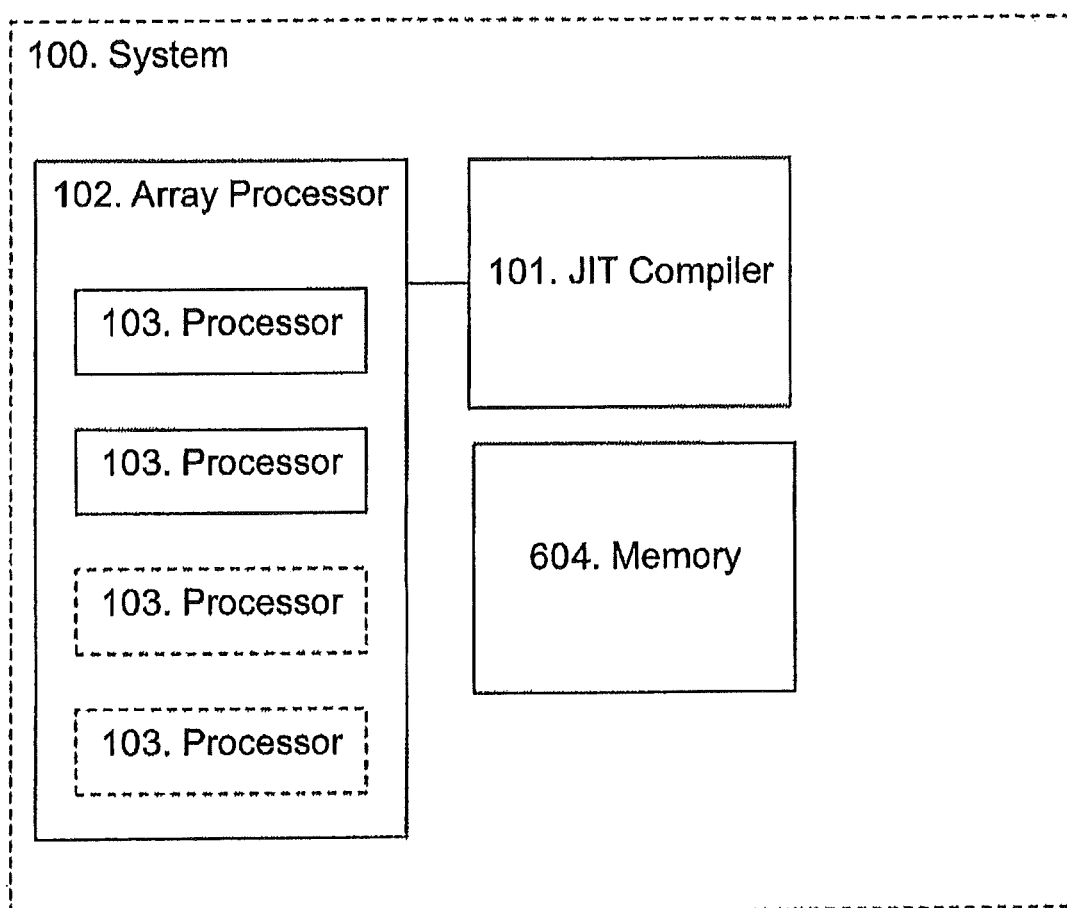
FIG. 1 shows a system in accordance with embodiments herein.

FIG. 1 shows a system 100 in accordance with embodiments herein. The system 100 for handling compiled code comprises a Just-In-Time, JIT, compiler 101 for compiling code, and at least one array processor unit 102. The array processing unit 102 comprises a plurality of processors 103 for executing program code. The array processor unit 102 may be one or more General Purpose Graphics Processing Unit, GPGPU. The potential of using a GPGPU is huge since there are many more processing units on a GPGPU compared to a CPU, traditionally used. Consequently, jobs that may be parallelized may run much faster on a GPGPU and typically consume less battery power. However, to utilize the power of a GPGPU, same code runs on the different processors with different input data. A typical use case may be imaging processing where 32, or more, units are started in parallel with different input data. As long as there is no data dependency, the execution will go 32 times faster.

The in parallel executing is performed on the plurality of processors 103. The JIT compiler 101 is adapted to compile input program code, whereby compiled program code is generated for the input program code. The JIT compiler is adapted to, while compiling, identify at least two parts of the compiled program code to be executed in parallel. The array processor unit 102 is adapted to, in parallel, execute the identified at least two parts of compiled code speculatively on at least two respective of the plurality of processors. The system 100 is adapted to control if the at least two parts of in parallel executed code are in conflict with each other.

Thread level speculation may be utilized on a CPU in combination with a OPGPU or any other types of array processors. The program code may be JavaScript code. During JavaScript execution there is no guarantee that many similar jobs may be identified, that the jobs could be started in a synchronous manner and that there is no data dependency between in-data. This may be solved by combining speculation and gathering statistics of the code during execution. It is to be noted that the methods described herein are not limited to JavaScript. The methods proposed may easily be extended to be used by any compiler or interpreter for a computer language.

A JIT compiler architectures may be extended to utilize also multicore processors such as GPGPUs (General Purpose Graphics Processing Unit) or any other types of array processors. An array processor, such as a GPGPU, may be used in combination with a CPU. Instead of generating code for the CPU only, as is the case traditionally, the code generator is extended to identify good candidates for the GPGPU and for selected parts of the code generate instructions for the GPGPU. Traditionally, instructions are instead generated for a CPU. Such candidates may for example be "for-loops" that under certain circumstances, e.g.

when there are no data dependencies between loop turns, naturally could be parallelized. Once some good candidate is identified and in-data parameters are ready, execution of the parallel code block is started immediately in a speculative manner. Once the execution is completed, the result is checked for conflicts and/or failures. If there is at least one conflict, a rollback is executed. If the execution was successful, the result is saved for immediate or later usage. Further, it is proposed that the JIT compiler, if any frequently executed parts, so called hot code areas, are detected, tries to detect which of these hot code areas that are feasible for a GPGPU.

Figure 2:
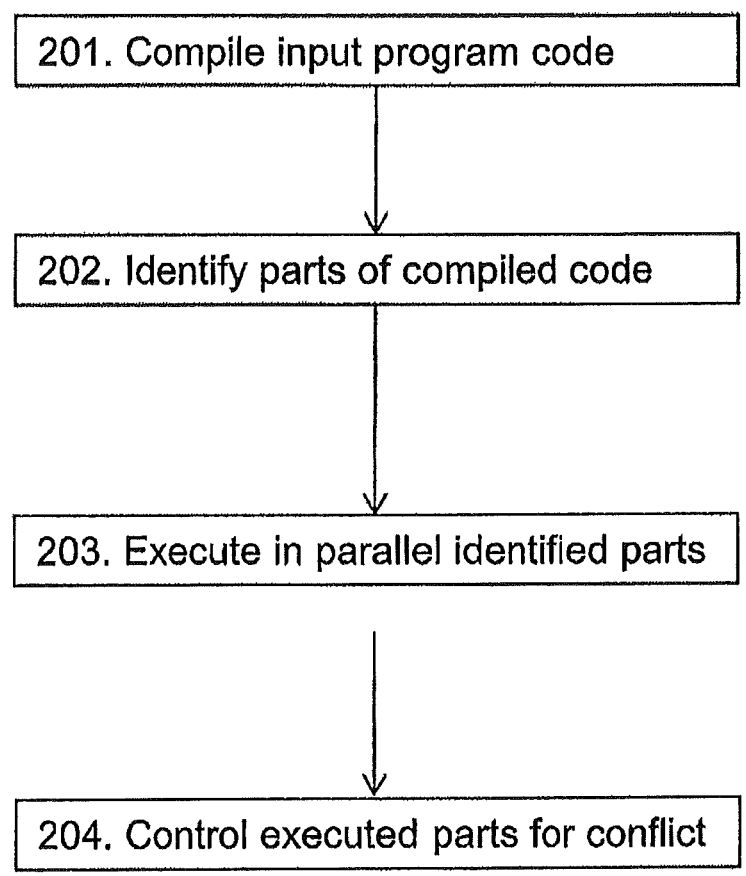
FIG. 2 is a flow chart showing methods herein.

With reference to FIG. 2, a method in the system 100 for handling compiled code will now be described.

Action 201

The JIT compiler 101 compiles input program code, whereby compiled program code is generated for the input program code. In the compiling action, parts of the program code being frequently executed may be identified, and, for such frequently executed parts, action 202, action 203 and action 204 may be performed.

Action 202

The JIT compiler 101 performs, while compiling, identifying at least two parts of the compiled program code to be executed in parallel. The identified parts of the compiled program code may be functions. The two or more functions may comprise a similar amount of instructions. More than two parts of the compiled program code may be identified and executed in parallel. The more than two parts of the compiled program code may be a plurality of functions. The identified two parts of compiled program code may comprise a similar amount of instructions. One of the identified two parts of compiled program code may comprise two or more functions merged together into a single function. Thus, merging of functions may be done into one being a super set of several functions to create one function that may run in parallel on different processors. Thereby it will be possible to run the single merged function in several cores in parallel with different indata. All of the identified parts of compiled program code comprising two or more functions may be merged together into a single function. All of the identified parts of compiled program code may comprise two or more functions merged together to a single function. More than two functions may be merged together to a single function. Thus, when a speculation candidate function is found, this function may be stored as suitable candidate, whilst new candidates are found. Once a feasible number of candidates are found, all the functions may be merged into a new function being a super-set of all candidate functions. The new super-set function may then be provided with an in-parameter which code portion shall be executed. Alternatively, instead of speculating directly statistics about feasible candidates may be gathered during execution. Apply optimizations may then start once there is data supporting that a function is a good candidate for speculation.

Action 203

At least two respective of the plurality of processors 103 executes speculatively in parallel the identified at least two parts of compiled code. In the executing action, parts of the program code being frequently executed may be identified, and, for such frequently executed parts, action 202, action 203 and action 204 may be performed. Statistics of the code may be gathered during the execution action 203.

Action 204

The system controls 204 if the at least two parts of in parallel executed code are in conflict with each other, and if the parts are in conflict, action 203 and 204 are repeated.

Further, in the previous description specific details have been set forth, such as particular embodiments for purposes of explanation and not limitation. However, it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes, e.g. a wireless modem or a wireless device, using hardware circuitry, e.g., analogue and/or discrete logic gates interconnected to perform a specialized function, ASICs, PLAs, etc., and/or using software programs and data in conjunction with one or more digital microprocessors or general purpose computers. Nodes that communicate using the air interface also have suitable radio communications circuitry. Moreover, the technology may additionally be considered to be embodied entirely within any form of computer-readable memory 604, such as solid-state memory, magnetic disk, or optical disk comprising an appropriate set of computer instructions that would cause a processor to carry out the techniques described herein.

Hardware implementation may include or encompass, without limitation, digital signal processor, DSP, hardware, a reduced instruction set processor, hardware, e.g., digital or analogue circuitry including but not limited to Application Specific Integrated Circuits, ASIC, and/or Field Programmable Gate Arrays, FPGAs, and where appropriate state machines capable of performing such functions.

In terms of computer implementation, a computer is generally understood to comprise one or more processors or one or more controllers, and the terms computer, processor, processing unit 601 and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description above comprises many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

When using the word "comprise" or "comprising" it shall be interpreted as non-limiting, in the meaning of consist at least of.

When using the word action/actions it shall be interpreted broadly and not to imply that the actions have to be carried out in the order mentioned. Instead, the actions may be carried out in any suitable order other than the order mentioned. Further, some action/actions may be optional.

The embodiments herein are not limited to the above described examples. Various alternatives, modifications and equivalents may be used.

The invention claimed is:

1. A method executed in a system for handling compiled program code comprising:
   a Just-In-Time, JIT, compiler for compiling input program code, wherein the JIT compiler is adapted to identify compiled program code to be executed in parallel, and
   at least one array processor unit comprising a plurality of processors for executing the compiled program code, the method comprising:
   compiling the input program code by the JIT compiler, whereby the compiled program code is generated from the input program code;
   while compiling the input program code by the JIT compiler, identifying, by the JIT compiler, at least two parts of the compiled program code to be executed in parallel;
   mapping the identified at least two parts of the compiled program code to be executed speculatively in parallel on at least two respective ones of the plurality of processors;
   determining that the identified at least two parts of the compiled program code being executed speculatively in parallel are in conflict with each other; and
   responsive to determining that the identified at least two parts of the compiled program code being executed speculatively in parallel are in conflict with each other, repeating the mapping and the determining.

2. The method according to claim 1, further comprising that the identified at least two parts of the compiled program code comprises a same number of instructions.

3. The method according to claim 1, further comprising that more than two parts of the compiled program code are identified.

4. The method according to claim 1, further comprising that at least one of the identified at least two parts of the compiled program code comprises two or more functions merged together into a single function.

5. The method according to claim 4, further comprising that more than two functions are merged together into a single function.

6. The method according to claim 4, further comprising that the two or more functions comprise a same number of instructions.

7. The method according to claim 1, further comprising that all of the identified at least two parts of the compiled program code comprises two or more functions merged together into a single function.

8. The method according to claim 1, further comprising, in the compiling, identifying parts of the compiled program code being frequently executed, and performing the identifying of the at least two parts of the compiled program code to be executed in parallel, the mapping, and the determining for the frequently executed parts of the compiled program code.

9. The method according to claim 1, further comprising, in the mapping, identifying parts of the compiled program code being frequently executed, and performing the identifying of the at least two parts of the compiled program code to be executed in parallel, the mapping, and the determining for the frequently executed parts of the compiled program code.

10. The method according to claim 1, wherein the at least one array processor unit comprises one or more General Purpose Graphics Processing Units, GPGPUs, and wherein the parallel execution of the compiled program code is performed on a plurality of processors comprised in the GPGPUs.

11. The method according to claim 10, wherein the GPGPUs are combined with a Central Processing Unit, CPU.

12. The method according to claim 1, wherein statistics of the compiled program code are gathered during the parallel execution of the compiled program code.

13. The method according to claim 1, wherein the input program code is JavaScript code.

14. The method according to claim 1, wherein the identified at least two parts of the compiled program code are functions.

15. The method according to claim 1, wherein more than two parts of the compiled program code are identified and executed in parallel.

16. The method according to claim 15, wherein the more than two parts of the compiled program code are a plurality of functions.

17. A system for handling compiled program code comprising:
   a Just-In-Time, JIT, compiler for compiling input program code, wherein the JIT compiler is adapted to identify compiled program code to be executed in parallel; and
   at least one array processor unit comprising a plurality of processors for executing the compiled program code,
   wherein the JIT compiler is adapted to compile the input program code, whereby the compiled program code is generated from the input program code, and is further adapted to, while compiling the input program code, identify at least two parts of the compiled program code to be executed in parallel,
   wherein the at least one array processor unit is adapted to map the identified at least two parts of the compiled program code to be executed speculatively in parallel on at least two respective ones of the plurality of processors, and is further adapted to determine that the identified at least two parts of the compiled program code being executed speculatively in parallel are in conflict with each other, and
   wherein the system is adapted to, responsive to determining that if the identified at least two parts of the compiled program code being executed speculatively in parallel are in conflict with each other, repeat the mapping and the determining.

18. The system according to claim 17, wherein the at least one array processor unit comprises one or more General Purpose Graphics Processing Units, GPGPUs, and wherein the parallel execution of the compiled program code is performed on a plurality of processors comprised in the GPGPUs.

* * * * *